April 19, 1966  W. S. NICHOLS  3,246,713
INDUSTRIAL TRUCK
Filed Nov. 29, 1963  3 Sheets-Sheet 1
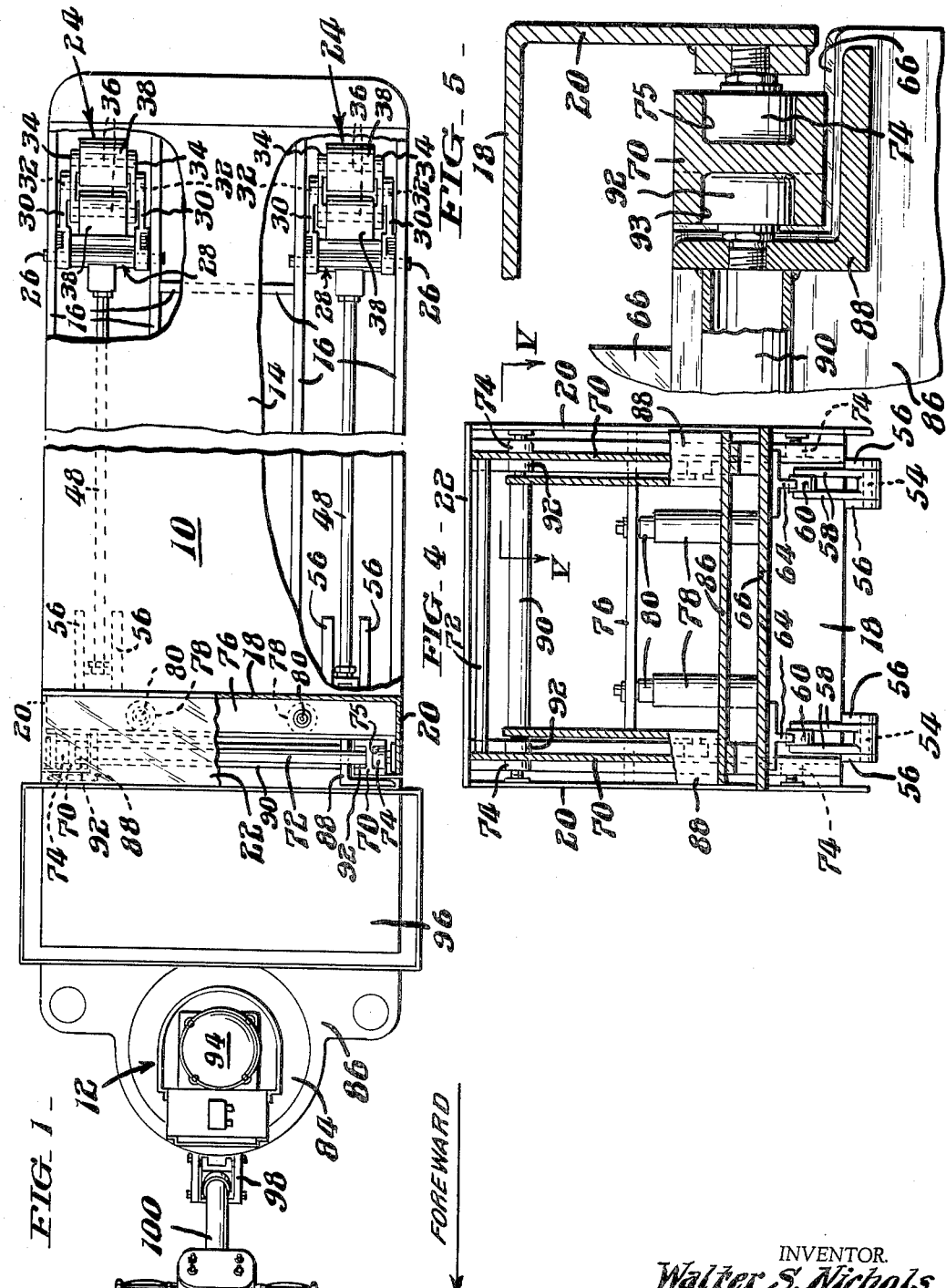
INVENTOR.
Walter S. Nichols.
BY
Paul & Paul
ATTORNEYS.

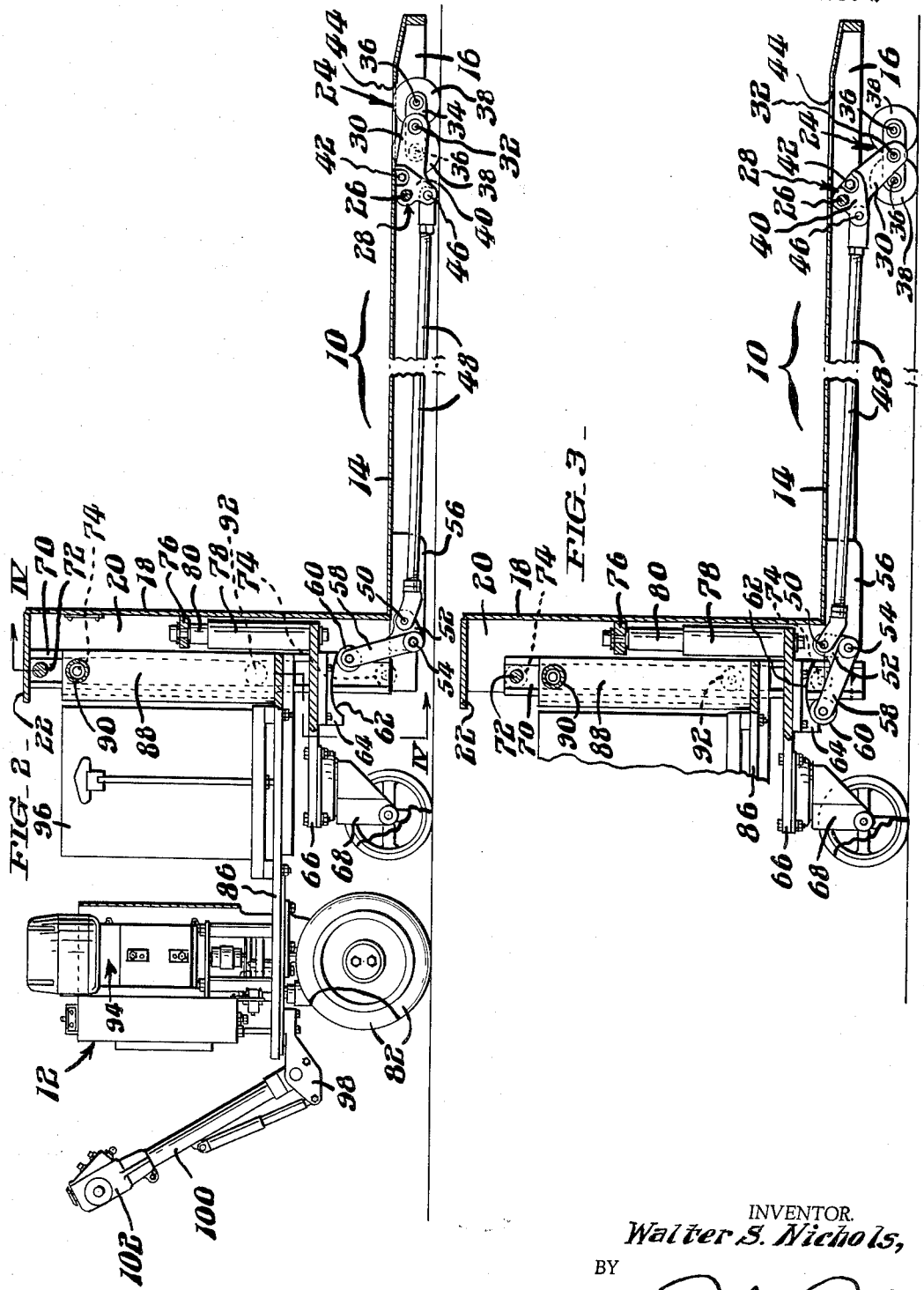

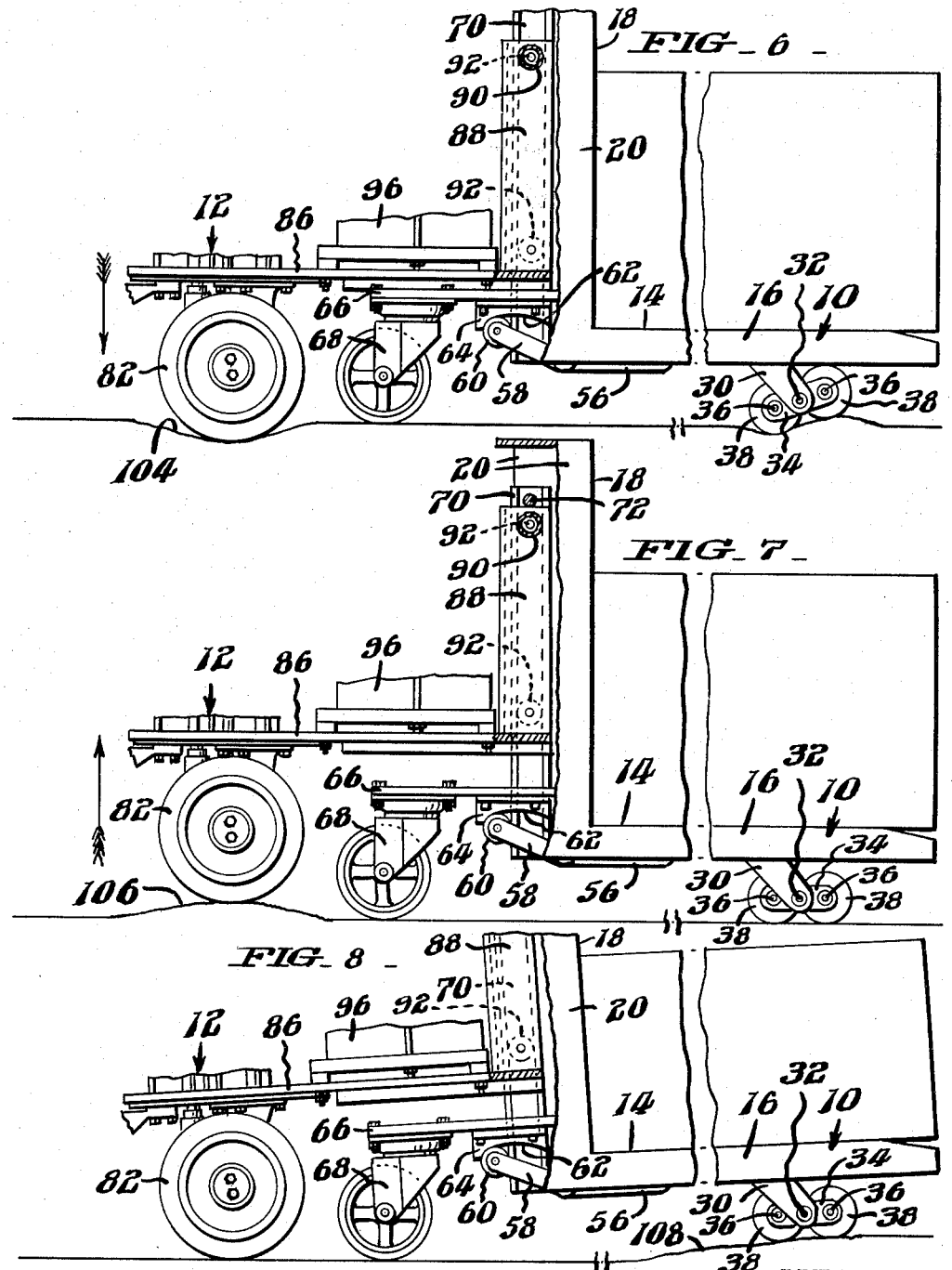

— Patented Apr. 19, 1966

3,246,713
INDUSTRIAL TRUCK
Walter S. Nichols, Philadelphia, Pa., assignor to Universal American Corporation, New York, N.Y., a corporation of Delaware
Filed Nov. 29, 1963, Ser. No. 326,796
5 Claims. (Cl. 180—13)

This invention relates generally to industrial trucks and particularly to industrial trucks of the type having a drive unit and a load carrying platform for transporting very heavy loads, such as so-called "conex" containers used in shipping military supplies.

Conventionally, the drive unit and platform of such a truck are articulated by means of a parallel link arrangement. However, such arrangements have not proved to be entirely satisfactory because if floor conditions are not ideal, they give rise to some loss of control when it is desired to inch the platform into a desired position. This is particularly true when the drive wheels happen to be over a depressed floor area.

Accordingly, an important object of the present invention is to provide a truck of the character aforesaid wherein the drive unit and platform are articulated in an improved manner, without the use of parallel linkage.

In addition, parallel link arrangements have not proved to be entirely satisfactory because if it is desired to increase the range of articulation, i.e., the range of movement of the drive unit and the platform vertically relative to each other, it is necessary to increase the lengths of the links, which is not always desirable because it may also be necessary to increase the overall length of the truck.

Accordingly, another object is to provide a truck of the character described wherein the range of articulation and the overall length of the truck are not interdependent factors.

Other objects of the invention will become apparent when the following description is read with reference to the accompanying drawings, in which:

FIG. 1 is a plan view of an industrial truck constructed in accordance with the invention, with some parts omitted and others broken away to expose details;

FIG. 2 is a side elevation of the truck, part being in section, showing the platform in lowered position;

FIG. 3 is similar to FIG. 2, but showing the platform in raised position;

FIG. 4 is a vertical section on line IV—IV of FIG. 2;

FIG. 5 is an enlarged section on line V—V of FIG. 4; and

FIGS. 6, 7 and 8 are side elevations showing how the driving unit and platform float relative to each other under varying floor conditions.

The following description is directed to the specific form of the invention illustrated in the drawings and is not intended to be addressed to the scope of the invention itself, which may be practiced in a wide variety of forms and arrangements.

The exemplary industrial truck constructed in accordance with the invention includes a platform, generally designated 10, and a drive unit, generally designated 12.

The platform 10 includes a horizontally extending plate 14 overlying a rigid frame 16. At the fore end of the platform is an upright plate 18 provided with a pair of forwardly extending flanges 20 respectively on opposite sides of the platform. Extending horizontally forwardly from the plate 18 is a plate 22, between the flanges 20.

At the aft end of the platform 10, disposed respectively on opposite sides thereof, are a pair of wheel assemblies 24 each including a pin 26 having opposite end portions thereof carried by laterally spaced members of the frame 16. The pin 26 pivotally mounts a carriage 28 which is provided with a pair of laterally spaced arms 30 each of which carries a pin 32 pivotally mounting a link 34. Carried by the links 34 are a pair of laterally spaced pins 36 each of which mounts a wheel 38. The carriage 28 also includes an arm 40 which mounts a stop 42 adapted to engage the underside of the plate 14. The plate 14 is provided with an opening 44 to accommodate the wheels 38.

Each of the arms 40 carries a pin 46 to which is connected a forwardly extending link 48. At the forward end of the link 48 a pin 50 connects the arm 40 to the arm 52 of a bell crank pivoted on a pin 54 having opposite end portions carried by laterally spaced brackets 56. The bell crank also is provided with an arm 58 which carries a roller 60.

The rollers 60 engage timing tracks 62 formed on members 64 affixed to the underside of a plate 66. The fore end of the plate 66 is supported upon a pair of laterally spaced swivel casters 68. The plate 66 has affixed thereto a frame including a pair of upright laterally spaced H-beams 70, the upper end portions of which are tied together by means of a horizontally extending tie bar 72. Each of the side flanges 20 mounts a pair of vertically spaced rollers 74 confined in a track 75 formed between the flanges of the associated H-beam. Seated upon the plate 66 is an electric motor powered hydraulic pump and a pair of laterally spaced fluid motors each including a cylinder 78 and a piston 80 working therein and secured to a horizontally extending bar 76 affixed to the plate 18.

The drive section 12 includes a drive wheel 82 underlying a ball bearing turntable 84 mounted in a horizontally extending deck plate 86. The plate 86 has affixed thereto a frame including a pair of upright laterally spaced angle bars 88, the upper end portions of which are tied together by means of a tie bar 90. Each of the angle bars 88 mounts a pair of vertically spaced rollers 92 confined in a track 93 formed between the flanges of the associated H-beam.

Mounted over the turntable 84 is a drive motor 94 and to the rear of the drive motor 94 is a battery 96. Carried by the turntable 84 is a pivot support 98 from which extends a steering bar 100 having a control head 102.

Referring particularly to FIGS. 1, 2 and 4, the platform 10 is in lowered position, and the rear end of platform 10 is carried by the floor engaging wheel assemblies 24. The upper portions of the wheels 38 project into openings 44 formed in the plate 14. The stops 42 engage the underside of the plate 14 and serve to secure the wheel carriages 28 against further counterclockwise rotation about the pin 26. The rollers 60 engage the aft end portions of the timing tracks 62.

The front end of platform 10 is carried by the laterally spaced swivel caster wheels 68 under the fore end of the plate 66.

On each side of the truck the vertically spaced rollers 74 engage in the outer roller confining track 75 between the flanges of the H-beam 70. Thus it will be noted that the interaction between the rollers 74 and the flanges of the H-beam 70 prevent jackknifing of the platform 10 and the wheeled means supporting the fore end thereof, i.e., the plate 66 and swivel casters 68.

Comparing FIG. 2 to FIG. 3, it will be noted that the platform 10 may be raised by extending the pistons 80. Rollers 74 ride up in the outer tracks 75 between the flanges of the H-beam 70. At the same time, the rollers 60 ride the timing tracks 62 and arms 58 and 52 swing counterclockwise, whereupon the links 48 move forwardly and the carriages 28 swing clockwise about the pins 26. The links 34 pivot about the pins 32 as required to maintain the wheels 38 in engagement with the floor.

The timing tracks 62 are so formed that the aft end of the platform 10 is raised at the same rate as the fore end so that the platform 10 will remain level during the platform elevating operation and will remain level when the platform is relowered. In other words, the vertical component of the swinging movement of the carriages 28 is always equal to the distance the pistons 80 are extended.

On each side of the truck the vertically spaced rollers 92 engage in the inner roller confining track 93 formed between the flanges of the H-beam 70. Thus it will be noted that the interaction between the rollers 92 and the flanges of the H-beam 70 prevent jackknifing of the drive unit 12 and the platform 10.

With the platform section 10 lowered, as in FIGS. 1, 2 and 4, the truck is backed under a load, and then fluid is supplied to the cylinders 78 in order to extend the pistons 80 and raise the platform 10 and the load thereon. Thereafter, the motor 94 is energized and power is applied to the platform 10 through rollers 92 confined between the flanges of the H-beams 70. The platform 10 responds instantly to any movement fore or aft of the drive unit 12.

FIGS. 6, 7 and 8 illustrate how the drive unit 12 floats relative to the platform 10. In FIG. 6, the drive wheels 82 are over a depression 104 in the floor. In this situation, the rollers 92 have moved downwardly in the inner roller confining tracks 93 between the H-beam flanges. The links 34 turn about the pins 32 to accommodate the rough floor, as shown. In FIG. 7, the drive wheels 82 are over a rise 106 on the floor. In this situation, the rollers 92 have moved upwardly in the inner roller confining tracks 93 between the H-beam flanges. In FIG. 8, the rear wheels are over a rise 108 on the floor. In this situation, the rollers 92 have again moved upwardly in the inner roller confining tracks 93 between the H-beam flanges.

What is claimed is:

1. In an industrial truck, the combination comprising a platform, first wheeled means supporting the aft end of said platform, second wheeled means supporting the fore end of said platform, means interconnecting said platform and second wheeled means including means carried by said second wheeled means and providing a set of vertically extending roller confining tracks, a set of vertically spaced rollers carried by said platform and engaging certain of said roller confining tracks so as to secure said platform and second wheeled means against jackknifing and so as to provide for movement of said platform and second wheeled means vertically relative to each other, means for moving said platform and second wheeled means vertically relative to each other, and a wheeled drive unit including a set of vertically spaced rollers engaged in others of said vertically extending roller confining tracks so as to secure said drive unit and platform against jackknifing and so as to provide for movement of said drive unit and platform vertically relative to each other, and means for propelling and steering said drive unit whereby to move said platform.

2. The combination defined in claim 1 wherein the second wheeled means mounts a rigid upright frame including laterally spaced members providing the vertically extending roller confining tracks, and the drive unit mounts a rigid upright frame including laterally spaced members carrying the vertically spaced rollers associated therewith.

3. The combination defined in claim 2 wherein one pair of the roller confining tracks face in opposite directions away from each other and another pair of the roller confining tracks face in opposite directions toward each other, the rollers carried by said platform are engaged in one pair of said roller confining tracks and the rollers carried by said drive unit are engaged in the other pair of said roller confining tracks.

4. The combination defined in claim 1 wherein the means supporting the aft end of the platform includes ground engaging wheels, and articulated carriage means interposed between said wheels and platform, and the means for moving said platform and second wheeled means vertically relative to each other includes fluid motor means interposed between said platform and second wheeled means and operable for moving the fore end of said platform and said second wheeled means vertically relative to each other, means carried by said second wheeled means and providing timing track means, and articulated linkage carried by said platform and adapted for reading said timing track means whereby to actuate said carriage means in response to movement of the fore end of said platform and second wheeled means vertically relative to each other to thereby maintain said platform level.

5. The combination defined in claim 4 wherein the articulated carriage means is adapted to swing downwardly about a horizontal axis thereby to raise the aft end of said platform in response to extension of said fluid motor means to raise the fore end of said platform, and the timing track means is formed so that the vertical component of said swinging movement is at all times equal to the distance said fluid motor means is extended.

References Cited by the Examiner

UNITED STATES PATENTS 2,661,183 12/1953 Framhein.
3,183,989 5/1965 Trusock et al. _____ 180—13

BENJAMIN HERSH, *Primary Examiner.*

A. HARRY LEVY, *Examiner.*